(12) United States Patent
Varjasi et al.

(10) Patent No.: US 10,659,300 B2
(45) Date of Patent: May 19, 2020

(54) SELF-FORMING NETWORK COMMISSIONING SYSTEM AND METHOD

(71) Applicant: CURRENT LIGHTING SOLUTIONS, LLC, East Cleveland, OH (US)

(72) Inventors: Tamas Varjasi, BudaPest (HU); Gergely Katz, Budapest (HU); Tamas Vegh, BudaPest (HU); Balazs Bencze, Budapest (HU); Sandor Polyak, Budapest (HU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 11 days.

(21) Appl. No.: 16/105,453

(22) Filed: Aug. 20, 2018

(65) Prior Publication Data
US 2019/0342153 A1 Nov. 7, 2019

Related U.S. Application Data

(60) Provisional application No. 62/667,495, filed on May 5, 2018.

(51) Int. Cl.
*H04L 12/24* (2006.01)

(52) U.S. Cl.
CPC ........ *H04L 41/082* (2013.01); *H04L 41/0893* (2013.01); *H04L 41/0896* (2013.01)

(58) Field of Classification Search
CPC ............ H05B 37/0218; H05B 37/0263; H05B 33/0815; Y02B 20/48; H04L 41/082; H04L 41/12; H04L 45/02; H04L 41/0896; H04L 41/0893; H04W 84/18; H04W 24/02; H04W 48/16; H04W 72/0406
See application file for complete search history.

(56) References Cited

U.S. PATENT DOCUMENTS 7,460,865 B2 * 12/2008 Nixon ................... H04W 76/14
455/428
8,655,995 B2 * 2/2014 Elston, III .......... H04L 12/2809
370/254

(Continued)

OTHER PUBLICATIONS

International Search Report and Written Opinion dated Aug. 19, 2019 which was issued in connection with PCT PCT/US2019/030457 which was filed on May 2, 2019.

(Continued)

*Primary Examiner* — Sargon N Nano
(74) *Attorney, Agent, or Firm* — Buckley, Maschoff & Talwalkar LLC

(57) ABSTRACT

A network system comprising node devices configured to be distributed in a structure and to self-form separate network groups; and a control commissioner device having a system coordinator device that is configured to communicatively couple with the node devices, the system coordinator device also configured to control formation of the separate network groups of different groups of the node devices by restricting which of the node devices can communicatively couple with different local coordinator devices, wherein the node devices of each of the separate network groups are configured to communicate with the local coordinator device associated with the network group.

20 Claims, 3 Drawing Sheets

(56) References Cited

U.S. PATENT DOCUMENTS

| | | | |
|---|---|---|---|
| 8,779,921 B1* | 7/2014 | Curtiss | G08B 25/009 |
| | | | 340/506 |
| 9,286,052 B1 | 3/2016 | Solan et al. | |
| 2002/0061009 A1* | 5/2002 | Sorensen | H04W 76/12 |
| | | | 370/351 |
| 2003/0135817 A1* | 7/2003 | Shear | G06F 16/258 |
| | | | 715/255 |
| 2005/0078624 A1* | 4/2005 | Shu | H04L 41/0806 |
| | | | 370/328 |
| 2005/0180343 A1* | 8/2005 | Van Valkenburg | H04L 63/083 |
| | | | 370/310 |
| 2007/0223497 A1* | 9/2007 | Elson | G01D 9/005 |
| | | | 370/400 |
| 2008/0057931 A1 | 3/2008 | Nass et al. | |
| 2011/0007665 A1* | 1/2011 | Dinur | H04L 41/0806 |
| | | | 370/254 |
| 2011/0255445 A1* | 10/2011 | Johnson | H04W 4/38 |
| | | | 370/255 |
| 2016/0173342 A1* | 6/2016 | Latham | H04L 41/22 |
| | | | 715/735 |
| 2018/0096588 A1* | 4/2018 | Shabah | H04W 4/90 |

OTHER PUBLICATIONS

Atul Rao et al., 'EDGC: Efficient Dynamic Group Caching Technique for Mobile Ad hoc Networks ', In: International Journal of Computer Applications, vol. 41, Issue 13, pp. 25-30, Mar. 2012.
Hussein Kdouh et al., 'Application of Wireless Sensor Network for the Monitoring Systems of Vessels', Jul. 18, 2012.

\* cited by examiner

SELF-FORMING NETWORK COMMISSIONING SYSTEM AND METHOD

FIELD

The inventive subject matter described herein relates to communication networks.

BACKGROUND

Communication networks can be formed from several devices that are able to communicate with each other (or at least with a few other devices). One example of a communication network is a ZigBee network that is based on an IEEE 802.15.4 specification. These types of networks can be used for communication with small, low-power digital radios.

Some networks are self-forming networks that are formed by node devices (e.g., routers, transceivers, etc.) communicating with each other to form network connections between and/or among the devices without external interaction. For example, the node devices in a ZigBee network can form the connections that define the network without a user having to provide input to the node devices to form the connections. Coordinator devices can be used to create the network by allowing some (but not all) node devices to join the network, but the node devices themselves can automatically form the communication connections that define the network.

One problem with self-forming networks is overlapping communication ranges of the node devices and the coordinator devices. If there are several coordinator devices in the same overlapping region and many node devices are attempting to join or form a self-forming network, the automatic network formation can result in two or more networks being formed with node devices that are not logically or efficiently grouped together in the different networks. For example, a system may be designed to have several networks self-formed with node devices in each room of several different rooms in a building forming a separate network. If the communication ranges of the coordinator devices and/or node devices overlap each other and/or extend into other rooms (than the devices are in), then one or more of the self-formed networks can be created with node devices that are in different rooms. If each network is to be formed with only those node devices in the same room, this can result in networks having inefficient communication routes and/or weak communication signals (e.g., due to walls between the different rooms).

Additionally, some self-formed networks may require firmware or other software updates to the node devices. If many node devices are trying to join or form a network at the same time, then updating all node devices can take a significantly long time, such as several hours. This updating can prevent the network from being available to perform other functions, such as detecting occupancies of rooms, automatically activating or deactivating lights, etc.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
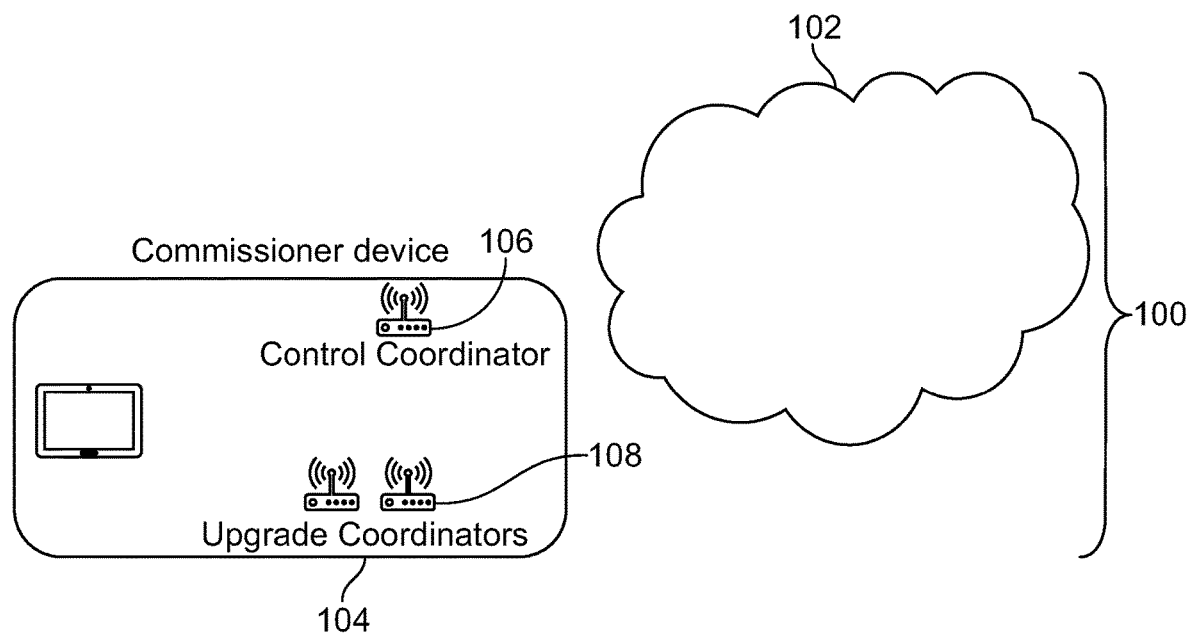
FIG. 1 illustrates one embodiment of a network commissioning system.

The inventive subject matter described herein relates to self-forming communication network systems. In one embodiment, a control commissioner device creates an intermediate commissioning state of a self-forming network. In this intermediate state, node devices that are to form the networks first connect with a system coordinator device of the control commissioner device (instead of connected with each other). This system coordinator device optionally can be referred to as a master or global coordinator device.

The system coordinator device controls the commissioning process to form the networks. For example, the system coordinator device can identify the node devices attempting to form the networks, such as by detecting wireless signals emitted by the node devices. The system coordinator device can create a table, list, or other memory structure of these node devices. The identification of the node devices can be completed before any of the node devices are permitted to join any network by the system coordinator device. The system coordinator device then determines which node devices are permitted to join which of several different networks. In one embodiment, the system coordinator device may have access to a map, list, table, or the like, that identifies which node devices are to be included in different networks. Each node device may be restricted to joining only a single network.

The system coordinator device can then notify plural local coordinator devices of which node devices are to be joined with each other and/or with the local coordinator device to form separate networks. For example, the system coordinator device can dictate that the node devices in each room join with a local coordinator device in the same room to form a network associated with that room. In a structure with several rooms, each room can have a network formed by those node devices in that room.

The local coordinator device can then form the network and allow the node devices identified by the system coordinator device to join that network. This joining can occur automatically. For example, node devices may broadcast signals to attempt to join the network of any local coordinator device that receives the broadcasted signals. If the local coordinator device received an identification of a broadcasting node device from the system coordinator device, then the local coordinator device can allow that node device to join the network associated with the local coordinator device. But, if the local coordinator device did not receive an identification of the broadcasting node device from the system coordinator device, then the local coordinator device does not allow that node device to join the network associated with the local coordinator device.

Optionally, the control commissioner device can include an upgrade coordinator device that updates firmware or software running on the node devices. The system coordinator device can communicate with the different node devices to determine the version, date, type, or the like, of software or firmware running on the node devices. The system coordinator device can determine if the software or firmware running on any node device needs to be updated. For those node devices needing to upgrade the software or firmware, the system coordinator device can direct the upgrade coordinator device to form an upgrade network with those node devices. The upgrade coordinator device can then send the data to these node devices in the upgrade network that are needed to upgrade or otherwise modify the software or firmware running on the node devices. For example, instead of upgrading the firmware or software on a node device, the version of the firmware or software can be downgraded so that all node devices in the same network are using the same version of the firmware or software. Upon completion of upgrading or otherwise modifying the firmware or software, the node devices can leave the upgrade network and rejoin the network to which the node devices belonged before upgrading or modifying the firmware or software.

The upgrade coordinator device can control how many node devices join the upgrade network based on available bandwidth and/or an expected length of time to upgrade or modify the firmware or software so that the time needed to upgrade or modify the firmware or software stays within designated limits (e.g., the upgrade or modification is completed within minutes instead of hours). If more node devices need the upgrade or modification than can join the upgrade network (e.g., due to bandwidth restrictions), then a first set of these node devices can join the upgrade network for the update or modification, and then disconnect from the upgrade network. A second set of other node devices can join the upgrade network for the upgrade or modification, and then disconnect from the upgrade network, and so on.

At least one technical effect of the subject matter described herein is the formation of efficient self-forming networks by restricting which node devices can join different networks. This can prevent node devices from joining a network where the node devices would have weaker wireless signals instead of joining another network where the wireless signals will be stronger. Additionally, the systems and methods described herein can prevent node devices from being unable to join any network. For example, if a node device is identified by the system coordinator device and is unable to join a network, then the system coordinator device can be moved closer to the node device or to a local coordinator device to ensure that this lost node device is coupled with the local coordinator device. Use of the upgrade coordinator device can result in faster modifications or upgrades to firmware or software running on the node devices, and the upgrade or modifications of many node devices can be scaled down (e.g., decreased by becoming faster) by adding more upgrade coordinator devices. Because the node devices are restricted as to which local coordinator devices that the node devices can network with, the time needed to set up or commission the networks can be decreased relative to allowing the node devices to join the network of any coordinator device.

FIG. 1 illustrates one embodiment of a network commissioning system 100. The system 100 can be used to commission or otherwise set up several smaller networks formed by a larger network group 102 of node devices. The networks can be self-forming networks that are formed by the node devices automatically joining the networks. While one example of the larger network group 102 and the smaller networks is a ZigBee self-forming network or networks, not all embodiments are limited to ZigBee networks. Other network protocols or standards may be used with the subject matter described herein.

Figure 2:
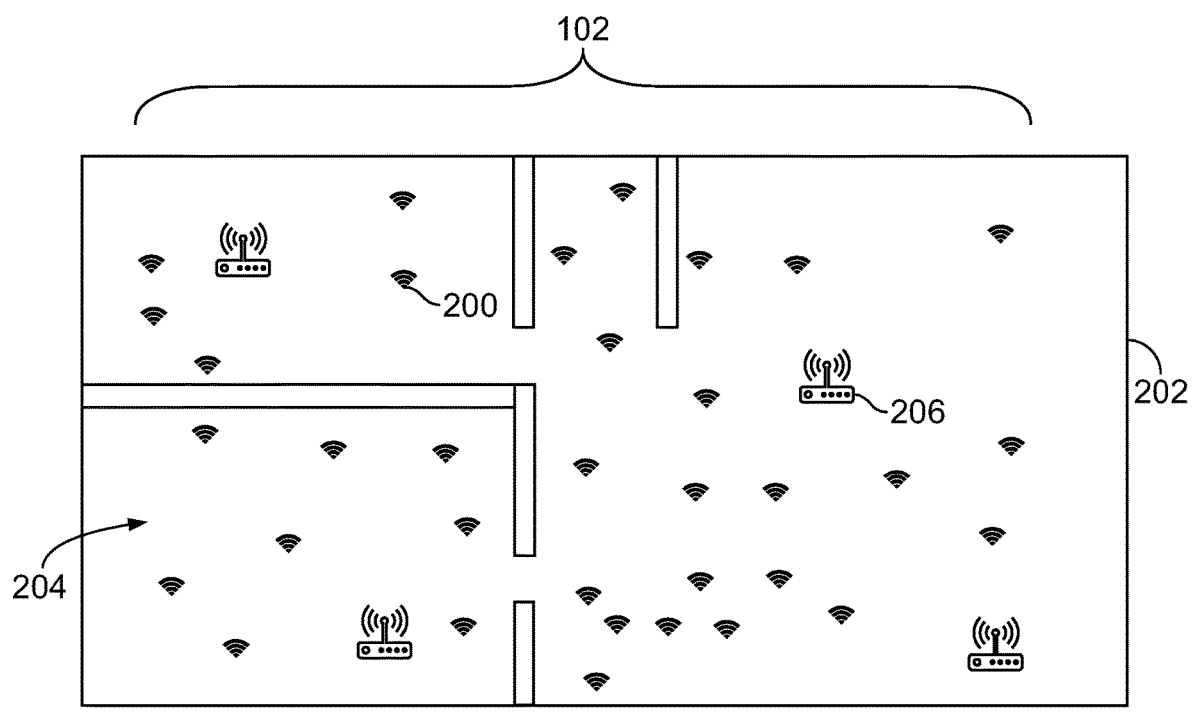
FIG. 2 illustrates a larger network group of node devices located throughout a structure.

With continued reference to the system 100 shown in FIG. 1, FIG. 2 illustrates the larger network group 102 of node devices 200 located throughout a structure 202. The structure 202 can represent a building or floor of a building having several separate rooms 204. The node devices 200 can include a variety of devices having circuitry that includes and/or is connected with one or more processors, such as one or more microprocessors, field programmable gate arrays, integrated circuits, or the like. The node devices 200 can include communication circuitry, such as radios, transceivers, routers, or the like. Optionally, the node devices 200 can include sensors, such as ambient light sensors, motion sensors, temperature sensors, or the like. The node devices 200 can be networked together in several different networks to monitor different areas (e.g., different rooms) and perform one or more actions based on the monitored areas. For example, the node devices 200 can be used to sense the presence of a person in a room and send a signal indicating the presence of the person. This signal can be communicated to a light switch controller, thermostat, camera, or the like, to activate or deactivate a light, change a setting in a thermostat, activate a camera, or the like.

The system 100 includes a control commissioner device 104 having a system coordinator device 106 and one or more upgrade coordinator devices 108. The system coordinator device 106 is labeled "Control Coordinator" in FIG. 2, and optionally can be referred to as a control coordinator device. The devices 104, 106, 108 represent one or more components formed of shared or separate hardware circuitry that includes and/or is connected with one or more shared or separate processors that perform the operations described herein. The devices 104, 106, 108 can include shared or separate communication devices, such as radios, transceivers, routers, or the like.

Figure 3:
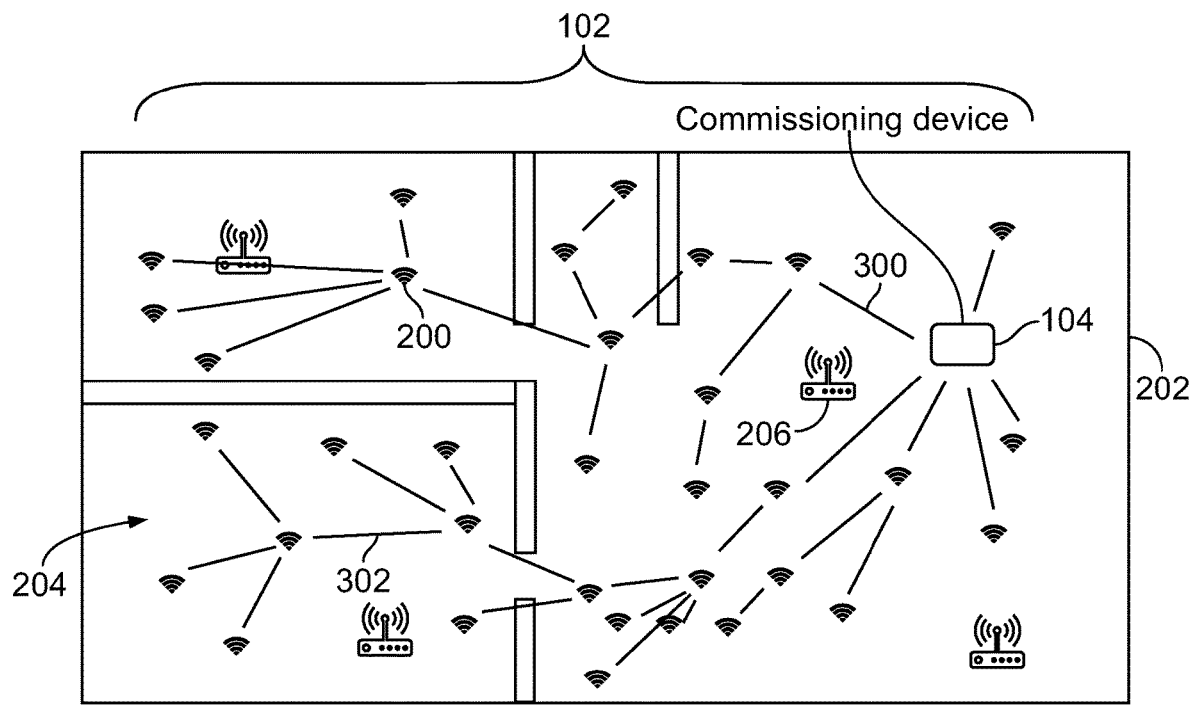
FIG. 3 illustrates one example of a system coordinator device shown in FIG. 1 communicatively coupling with the node devices in the larger network group shown in FIG. 2.

FIG. 3 illustrates one example of the system coordinator device 106 communicatively coupling with the node devices 200 in the larger network group 102. The system coordinator device 106 ("Commissioning Device" in FIG. 3) communicatively couples with the node devices 200 in the larger network group 102 of node devices 200. This group 102 can include all the node devices 200 within a structure, within a floor of the structure, or the like. Optionally, the group 102 can include fewer than all node devices 200 in a structure or floor.

The system coordinator device 106 can establish direct communication links 300 and/or indirect communication links 302 with the node devices 200. An indirect communication link 302 is a communication pathway (wired and/or wireless) between the system coordinator device 106 and a node device 200 that passes through at least one other node device 200. A signal communicated from the system coordinator device 106 to an indirectly connected node device 200 can be received by the other node device 200 and forwarded onto the indirectly connected node device 200. A direct communication link 300 is a communication pathway (wired and/or wireless) between the system coordinator device 106 and a node device 200 that does not pass through any other node device 200. A signal communicated from the system coordinator device 106 to a directly connected node device 200 is not received by another node device 200 and forwarded onto the directly connected node device 200.

The system coordinator device 106 can communicatively couple with the node devices 200 by receiving wireless signals that are broadcast, emitted, or transmitted by the node devices 200 and optionally by sending a signal to the node devices 200 to create communication links or connections between the device 106 and the node devices 200. Optionally, one or more of the node devices 200 and/or other devices described herein can communicate signals over, through, or via one or more wired connections.

In one embodiment, the system coordinator device 106 identifies which node devices 200 are in the larger group 102 based on signals received from the node devices 200. For example, the node devices 200 can broadcast signals that include unique identifying information of the node devices 200. This information can include a network address (e.g., a media access control address), a serial number, or other uniquely identifying information. The system coordinator device 106 can form a memory structure, such as a list, table, or the like, of the identifying information received from the node devices 200. This can allow for the system coordinator device 106 to determine which node devices 200 are available for forming networks. Optionally, the system coordinator device 106 can be provided with a list of the node devices 200, such as from an operator of the control commissioner device 104. The list, table, or the like, of the node devices 200 can be stored in a memory of the control commissioner device 104, such as a computer hard drive, electrically erasable programmable read only memory, an optical disc, a flash drive, or the like.

The system coordinator device 106 can associate different groups of the node devices 200 with different local coordinator devices 206 to form different local networks. The local coordinator devices 206 represent one or more components formed of separate hardware circuitry that includes and/or is connected with one or more processors that perform the operations described herein in connection with the local coordinator devices 206. The local coordinator devices 206 can receive signals or other communications from the node devices 200 and can communicate with the node devices 200 to perform one or more operations. For example, a local coordinator device 206 can receive radio signals from the node devices 200 in the same network as the local coordinator device 206 and can perform one or more actions (e.g., turning a light on or off, activating a camera, activating a lock, etc.) based on the signals received from the node devices 200.

The system coordinator device 106 can create two or more smaller local network groups or networks from the node devices 102 in the larger network group 102. In one embodiment, the system coordinator device 106 is provided with a list, table, or the like, of which node devices 102 are located in different rooms 204 of the structure 202. This list, table, or the like, can be provided by an operator of the system 100 or can automatically be determined (e.g., based on the location of the system coordinator device 106 and the signal strengths of signals sent by the node devices 200 as the system coordinator device 106 is moved between different rooms 204). For example, the signals sent by the ten (or other number) node devices 200 having the greatest strength (relative to signals received from other node devices 200) can be used to select those node devices 200 for the network associated with a local coordinator device 206 that is near the system coordinator device 106 as the strongest signals are received. The local coordinator device 206 can be near the system coordinator device 106 when the local coordinator device 206 is in the same room 204 as the system coordinator device 106 or when the local coordinator device 206 is closer to the system coordinator device 106 than another local coordinator device 206 that is in the same room 204.

The system coordinator device 106 can be provided with a list, table, or the like, of which local coordinator devices 206 are in different rooms 204 of the structure 202. This list, table, or the like, can be provided by an operator of the system 100 or can automatically be determined (e.g., based on the location of the system coordinator device 106 and the signal strengths of signals sent by the local coordinator devices 206 as the system coordinator device 106 is moved between different rooms 204).

The system coordinator device 106 can assign different groups of node devices 200 to different local coordinator devices 206 to define the local networks or network groups formed by the node devices 200. For example, the system coordinator device 106 can use the locations of the node devices 200 and the local coordinator devices 206 to assign the node devices 200 and the local coordinator device 206 in the same room 204 to the same network group.

Figure 4:
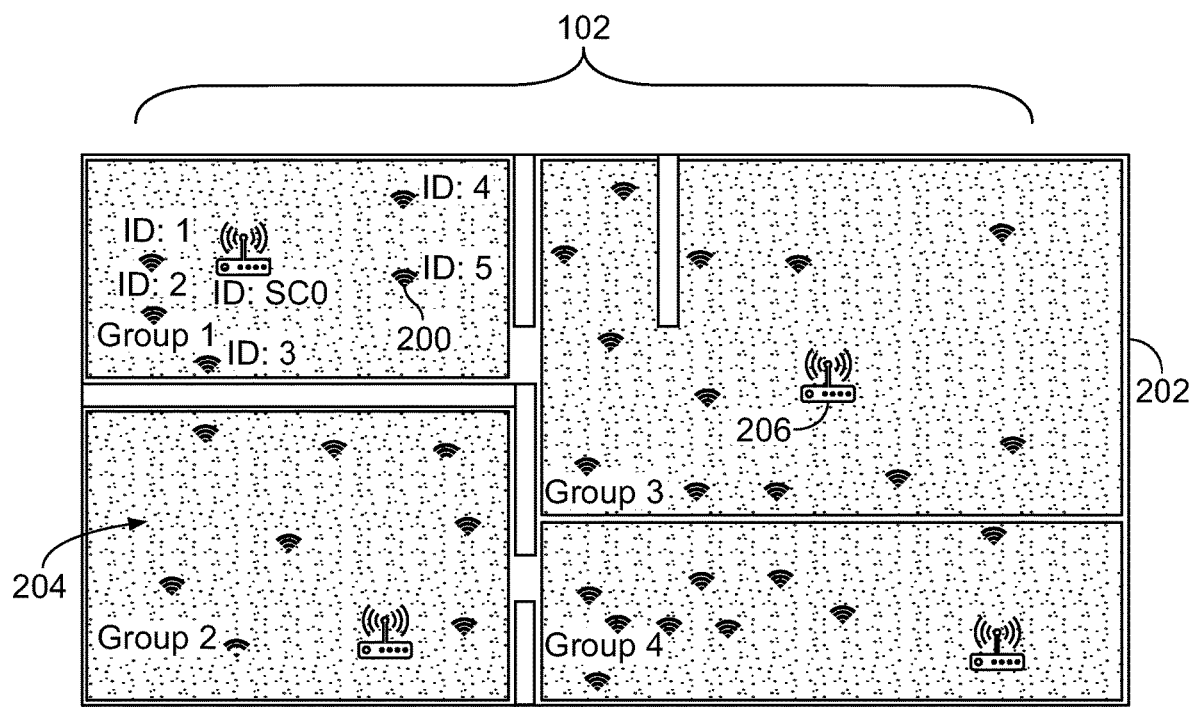
FIG. 4 illustrates one example of the assignment of different node devices and local coordinator devices to different network groups.

FIG. 4 illustrates one example of the assignment of different node devices 200 and local coordinator devices 206 to different network groups. As shown, the system coordinator device 106 forms four local network groups or networks labeled "Group 1," "Group 2," and so on, based on the locations of the node devices 200 and the local coordinator devices 206. With respect to the local networks labeled Group 1 and Group 2, the node devices 200 in the same room 204 as a local coordinator device 206 are assigned to the same network as that local coordinator device 206. With respect to the local networks labeled Group 3 and Group 4, some node devices 200 in the same room 204 are assigned to a local network of one local coordinator device 206, while other node devices 200 in the same room 204 are assigned to another local network of another local coordinator device 206. The system coordinator device 106 can assign the node devices 200 to the local coordinator devices 206 based on the locations of the node devices 200 and the local coordinator devices 206 determined from a map, blueprint, or the like, of the structure 202.

In one embodiment, the system coordinator device 106 can assign or allocate the node devices 200 to the different local networks so that no node device 200 is included in two or more networks. For example, each node device 200 that is assigned to a network may not be concurrently assigned to another local network. This can help ensure that the node devices 200 communicate with the local coordinator device 206 and/or node devices 200 of the same network, and not with other local coordinator devices 206 and/or node devices 200 of other networks. Alternatively, the system coordinator device 106 can assign or allocate the node devices 200 such that one or more of the node devices 200 are concurrently assigned to the same network.

The assignment of the node devices 200 to the local coordinator devices 206 by the system coordinator device 106 can ensure that only those node devices 200 that are in the same room 204 are connected in a network together. Without the system coordinator device 106 assigning the node devices 200 to the local coordinator devices 206, one or more node devices 200 may join the network of a local coordinator device 206 in another room 204. This can result in the formation of inefficient networks as walls, doors, or the like, that separate the rooms 204 can interfere with operation of the networks having node devices 200 in separate rooms 204.

The system coordinator device 106 can send instruction signals to the node devices 200 to notify each or the node devices 200 of which local coordinator device 206 that the node device 200 is assigned. The system coordinator device 106 may then decouple from the node devices 200 and the local coordinator devices 206 such that the network previously formed of the system coordinator device 106 and the node devices 200 no longer exists (e.g., signals are no longer communicated between the system coordinator device 106 and the node devices 200).

The node devices 200 and the local coordinator devices 206 to which the node devices 200 are assigned may then form the several networks. In one embodiment, the system coordinator device 106 includes unique identifying information of the local coordinator device 206 to which the node devices 200 are assigned in the instruction signals sent to the node devices 200. Each of the node devices 200 can then establish communication links with the local coordinator device 206 to which the node device 200 is assigned by sending a joining signal to the local coordinator device 206 (e.g., by sending the joining signal to the media access control address of the local coordinator device 206. The local coordinator device 206 can send a reply signal to the node device 200. Receipt of the joining signal by the local coordinator device 206 from a node device 200 and receipt of the reply signal by that node device 200 from the local coordinator device 206 can establish a communication link between the node device 200 and the local coordinator device 206. For example, after this exchange of signals, the node device 200 can communicate with the local coordinator device 206. The node device 200 has now joined the network that is managed or controlled by the local coordinator device 206.

In another embodiment, the node devices 200 can broadcast signals to the local coordinator devices 206 that identify the node devices 200 (e.g., by including the unique identifying information of the node device 200 that sends the signal). These signals can seek to join the network associated with the local coordinator device 206. The local coordinator devices 206 receive these joining signals from the node devices 200, and compare the identifying information included in the joining signals to the list, table, or other memory structure in the local coordinator devices 206 that includes the node devices 200 assigned to the networks of the local coordinator devices 206. For example, the local coordinator devices 206 can include separate or shared computer memories that store lists or tables of different groups of the node devices 200 assigned to the different local coordinator devices 206.

Each local coordinator device 106 can compare the unique identifying information contained in each joining signal received by that local coordinator device 206 (from a node device 200) with the list or table of identifying information associated with (e.g., assigned to) that local coordinator device 206. If the identifying information in a joining signal matches or otherwise corresponds with one or more of the entries of identifying information in the list or table of assigned node devices 200, then the local coordinator device 206 can send a reply signal to the node device 200. Receipt of the joining signal by the local coordinator device 206 from a node device 200 and receipt of the reply signal by that node device 200 from the local coordinator device 206 can establish a communication link between the node device 200 and the local coordinator device 206. For example, after this exchange of signals, the node device 200 can communicate with the local coordinator device 206. The node device 200 has now joined the network that is managed or controlled by the local coordinator device 206.

But, if the identifying information in a joining signal does not match or otherwise correspond with one or more of the entries of identifying information in the list or table of assigned node devices 200, then the local coordinator device 206 can send a rejection signal to the node device 200 or may not send any signal to the node device 200 in response to receiving the joining signal. Receipt of the rejection signal by the node device 200 from the local coordinator device 206 or the failure of the node device 200 to receive the reply signal from the local coordinator device 206 that is described above can prevent the node device 200 from establishing a communication link between the node device 200 and the local coordinator device 206, and can prevent that node device 200 from joining the network of the local coordinator device 206.

As described above, a node device 200 can join a network managed or controlled by a local coordinator device 206 if the identifying information of the node device 200 matches or otherwise corresponds with a list or table of identifying information of node devices 200 assigned to the local coordinator device 206. The identifying information can match when the identifying information of the node device 200 is the same as one or more pieces or items of identifying information assigned to the local coordinator device 206. For example, if the media access control address of a node device 200 is 12-34-56-78-90-12 and the list of identifying information stored at the local coordinator device 206 includes the address of 12-34-56-78-90-12, then the node device 200 has matching identifying information and is allowed to join the network of the local coordinator device 206. The identifying information of a node device 200 can otherwise correspond with the identifying information assigned to the local coordinator device 206 when the identifying information of the node device 200 falls within a larger group of identifying information.

For example, one or more octets in the media control addresses assigned to the local coordinator device 206 may be replaced with wildcards, indicating that any value in these octets can be accepted by the local coordinator device 206 to join the network. The list of identifying information assigned to the local coordinator device 206 may include the media control address of 12-34-56-XX-90-21, indicating that any node devices 200 having a media control address with a first octet of 12, a second octet of 34, a third octet of 45, a fifth octet of 90, and a sixth octet of 21 are allowed to join the network, regardless of the value of the media control address of the node device 200 in the fourth octet.

In one embodiment, the system coordinator device 106 determines whether to upgrade or otherwise modify software and/or firmware running on one or more of the node devices 200. The system coordinator device 106 can communicate with the node devices 200 to determine the identity and/or version of software and/or firmware running on the node devices 200. This can occur by each or several of the node devices 200 including identifying information in signals sent by the node device 200 that designates the identity (e.g., name) and/or version (e.g., version number, release date, etc.) of the software and/or firmware currently operating on the node devices 200 to control operation(s) of the node devices 200. This information can be included in the same signals that are broadcast by the node devices 200 and used by the system coordinator device 106 to determine which node devices 200 are to be assigned to the different local coordinator devices 206. Alternatively, this information can be included in other signals sent by the node devices 200. Optionally, the system coordinator device 106 can send a query signal to one or more of the node devices 200 that seeks identification of the identity and/or version of the software and/or firmware running on the node devices 200. In response, the node devices 200 can send the identifying signals that designate the identity and/or version of software and/or firmware running on the node devices 200.

The system coordinator device 106 can determine whether the software and/or firmware running on one or more of the node devices 200 needs to be updated or otherwise modified. In one embodiment, the system coordinator device 106 can determine that the software and/or firmware running on a node device 200 needs to be updated when the identity and/or version of the software or firmware does not match the identity and/or version of the software or firmware running on other node devices 200. As another example, the system coordinator device 106 can determine that the software and/or firmware running on a node device 200 needs to be updated when the identity and/or version of the software or firmware does not match a designated identity and/or designated version of software or firmware. For example, the system coordinator device 106 can be programmed to store a name and version of software or firmware that is to be running on all node devices 200. If the name or version of software or firmware running on a node device 200 does not match this designated name or version, then the system coordinator device 106 determines that the software or firmware needs to be upgraded or modified.

The software or firmware running on a node device 200 may need to be upgraded when the node device 200 is running an older version of the software or firmware. The software or firmware running on a node device 200 may need to be modified in another way when the node device 200 is running a different or newer version of the software or firmware. For example, the software or firmware running on a node device 200 may need to be downgraded or otherwise replaced with an older version of the software or firmware.

Response to determining that the software or firmware of one or more node devices 200 needs to be updated or modified, the system coordinator device 106 can direct one or more upgrade coordinator devices 108 (shown in FIG. 1) to change the software or firmware running on those node devices 200. The system coordinator device 106 can provide the upgrade coordinator device(s) 108 with a list, table, or other memory structure that uniquely identifies the node devices 200 needing the software or firmware modification. For example, the system coordinator device 106 can provide a list of network addresses of the node devices 200 needing the software or firmware modification.

The system coordinator device 106 and/or the upgrade coordinator device 108 can then send a decouple signal to the identified node devices 200. This signal can instruct the identified node devices 200 to communicatively decouple from the network to which the identified node devices 200 are assigned (e.g., by ending the communication link with the local coordinator device 206 of the network). This or another signal can be sent from the system coordinator device 106 to instruct these node devices 200 to form an upgrade network with one or more of the upgrade coordinator devices 108. This system coordinator device 106 can provide the node devices 200 with the network address (or other unique identifying information) of the upgrade coordinator device(s) 108. The node devices 200 can then communicate with the upgrade coordinator device 108 to form the upgrade network, similar to as described above in connection with forming the networks with the local coordinator devices 206.

The upgrade coordinator device 108 can send one or more signals containing the data needed to upgrade or otherwise modify the software or firmware running on the node devices 200 that are connected with the upgrade coordinator device 108 in the upgrade network. The software or firmware on the node devices 200 that are joined to the upgrade network can be upgraded or otherwise modified by the data in these signals. Following the upgrade or modification of the software or firmware, the upgrade coordinator device 108 can terminate the communication links with the node devices 200 and/or can send a termination signal to the node devices 200. The node devices 200 can then decouple from the upgrade network and re-couple with the local coordinator device(s) 206 to which the node devices 200 are assigned to re-form the networks.

In one embodiment, the upgrade coordinator device 108 can form the upgrade network with node devices 200 currently or previously joined to different local coordinator devices 206 in different, non-overlapping local networks. Stated differently, the upgrade coordinator device 108 can concurrently upgrade some node devices 200 that were joined to one local network and other node devices 200 joined to one or more other local networks.

The number of node devices 200 needing an upgrade or modification of software or firmware may be so large that concurrently upgrading or modifying the software or firmware of all these node devices 200 may require a long time (e.g., more than one hour). For example, because the bandwidth available for communication between or among the node devices 200 and the upgrade coordinator device 108 can be limited, sending the data signals to update or modify the software or firmware on too many node devices 200 at the same time can significantly extend the time needed to update or modify the software or firmware. The upgrade coordinator device 108 and/or the system coordinator device 106 can restrict how many node devices 200 are upgraded or modified based on bandwidth limitations. For example, fewer than all node devices 200 needing upgrades or modifications may couple with the upgrade network. The upgrade coordinator device 108 can select a first subset of the node devices 200 identified as needing upgrades or modifications. These node devices 200 can connect with the upgrade coordinator device 108 in an upgrade network to upgrade or modify the software or firmware on these node devices 200. Then, these node devices 200 can decouple from the upgrade network and the upgrade coordinator device 108 can select a different, second subset of the node devices 200 identified as needing upgrades or modifications. These node devices 200 can connect with the upgrade coordinator device 108 in an upgrade network to upgrade or modify the software or firmware on these node devices 200. This process can continue until the node devices 200 needing upgrades or modifications are upgraded or modified by the upgrade coordinator device 108.

The upgrade coordinator device 108 can change how many node devices 200 are upgraded or modified at the same time based on the bandwidth available to the upgrade network. For example, as the amount of data bandwidth available to the upgrade network for communicating the data signals needed to upgrade or modify the node devices 200 increases, more node devices 200 can be concurrently upgraded or modified. But, as the amount of data bandwidth available to the upgrade network for communicating the data signals needed to upgrade or modify the node devices 200 decreases, fewer node devices 200 can be concurrently upgraded or modified. The upgrade coordinator device 108 can change how many node devices 200 are in each subset of node devices 200 being concurrently upgraded or modified as the amount of available bandwidth changes.

Optionally, the system coordinator device 106 can change how many upgrade coordinator devices 108 are used to upgrade the node devices 200 based on how many node devices 200 require upgrades or modifications. The system coordinator device 106 can select a greater number of upgrade coordinator devices 108 to be activated to upgrade the node devices 200 as the number of node devices 200 needing upgrades or modifications increases, and can select a lesser number of upgrade coordinator devices 108 to be activated to upgrade the node devices 200 as the number of node devices 200 needing upgrades or modifications decreases.

Figure 5:
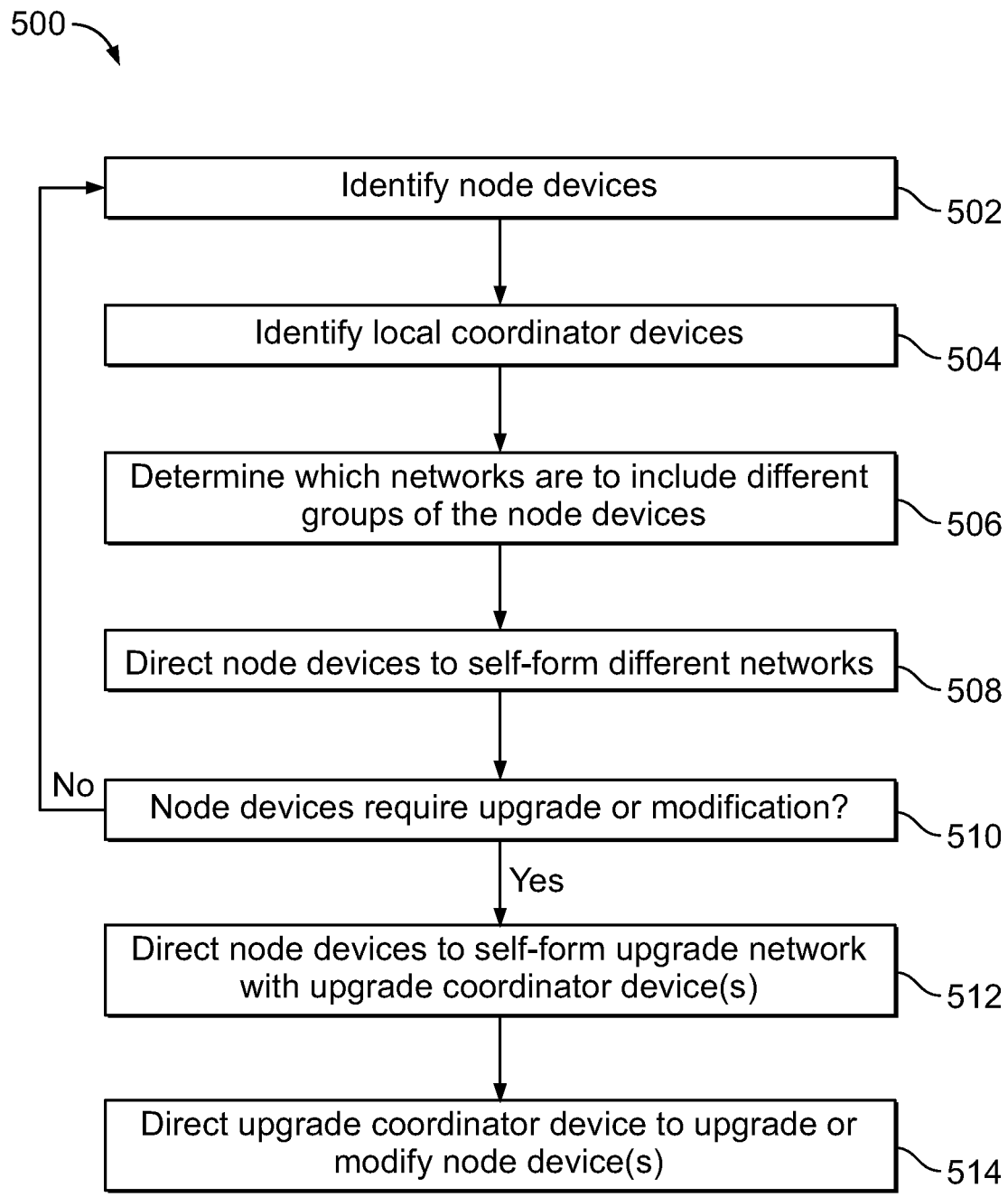
FIG. 5 illustrates one embodiment of a flowchart of a method for commissioning self-forming networks.

FIG. 5 illustrates one embodiment of a flowchart of a method 500 for commissioning self-forming networks. The method 500 can represent the operations performed by the control commissioner device 104 shown in FIG. 1. At 502, node devices are identified. The node devices can be identified by the control commissioner device being moved around or throughout an area where the node devices are located. For example, the control commissioner device can be a handheld or otherwise mobile apparatus that can move through different rooms in a building. As the control commissioner device moves, the system coordinator device of the control commissioner device can detect signals broadcast by different node devices. For example, the system coordinator device can move in and out of wireless communication ranges of the node devices, and can identify the node devices based on signals sent by the node devices while the system coordinator device is within range of the node devices. Alternatively, the system coordinator device can be provided (e.g., programmed) with a list of the node devices.

At 504, local coordinator devices are identified. The local coordinator devices can be identified by the control commissioner device being moved around or throughout an area where the local coordinator devices are located. As the control commissioner device moves, the system coordinator device of the control commissioner device can detect signals broadcast by different local coordinator devices. For example, the system coordinator device can move in and out of wireless communication ranges of the local coordinator devices, and can identify the local coordinator devices based on signals sent by the local coordinator devices while the system coordinator device is within range of the local coordinator devices. Alternatively, the system coordinator device can be provided (e.g., programmed) with a list of the local coordinator devices.

At 506, a determination is made as to which networks are to include different groups of the node devices. As one example, the system coordinator device can examine the locations of the node devices, the locations of the local coordinator devices, and the locations of rooms within a structure to determine how to assign the node devices to different local networks. The system coordinator device can assign the node devices in the same room to the local coordinator device located in that room. Optionally, the system coordinator device can assign the node devices to the closest local coordinator device. As another example, the system coordinator device can assign the node devices to a local coordinator device in the same room as the node devices and that is closer to the node devices than one or more other local coordinator devices located in the same room.

At 508, the node devices are directed to self-form different networks. As one example, the system coordinator device can send instruction signals to the node devices that direct the node devices to establish communication links with and self-form a network with the local coordinator device to which the node devices are assigned. As another example, the system coordinator device can inform the local coordinator devices of which node devices are assigned to the different local coordinator devices. The local coordinator devices can then allow or prevent the node devices from forming the corresponding networks with the local coordinator devices based on which node devices are assigned to the local coordinator devices.

At 510, a determination is made as to whether one or more of the node devices require an upgrade or modification. The system coordinator device can determine the versions and/or identities of the software or firmware running on the node devices based on signals received from the node devices. The system coordinator device can determine whether the software or firmware on any node devices needs to be changed so that the node devices run the same software or firmware, and the same version of the software or firmware. If an upgrade or modification is needed, then flow of the method 500 can proceed toward 512. Otherwise, flow of the method 500 can return toward 502 or optionally can terminate. For example, the method 500 can return toward 502 to determine if any additional node devices are attempting to join one or more local networks.

At 512, the node devices are directed to self-form one or more upgrade networks with one or more upgrade coordinator devices. The system coordinator device can send signals to the node devices requiring upgrading or modification that direct the node devices to form an upgrade network with an identified upgrade coordinator device. Optionally, the system coordinator device can identify these node devices to the upgrade coordinator device(s), and the upgrade coordinator device can allow or prevent node devices from self-forming the upgrade network that includes the upgrade coordinator device based on which node devices were identified. As described above, the system coordinator device can increase or decrease how many upgrade coordinator devices are used to self-form upgrade networks based on how many node devices are identified as needing upgrades or modifications.

At 514, the upgrade coordinator device is directed to upgrade or otherwise modify the software or firmware on the node devices. The system coordinator device can instruct the upgrade coordinator device to send data signals to the node devices that are joined to the upgrade network so that the software or firmware on these node devices is upgraded or otherwise modified. As described above, the upgrade coordinator can control how many node devices are concurrently upgraded or modified based on bandwidth restrictions. This can help prevent the upgrading of many node devices from taking too long. For example, many node devices can be upgraded more quickly by dividing the node devices into smaller subsets and sequentially upgrading the different subsets of node devices, instead of trying to upgrade all the node devices at once. Flow of the method 500 can terminate or optionally can return to 502.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A network system comprising:
   node devices configured to be distributed in a structure and to self-form separate network groups; and
   a control commissioner device having a system coordinator device that is configured to communicatively couple with the node devices, the system coordinator device also configured to control formation of the separate network groups of different groups of the node devices by restricting which of the node devices can communicatively couple with different local coordinator devices, the control commissioner device including an upgrade coordinator device configured to change one or more of software or firmware of one or more of the node devices by directing the one or more node devices to communicatively decouple from the corresponding local coordinator device and to communicatively couple with the upgrade coordinator device,
   wherein the node devices of each of the separate network groups are configured to communicate with the local coordinator device associated with the network group.

2. The network system of claim 1, wherein the system coordinator device also is configured to determine whether to change one or more of software or firmware of one or more of the node devices, and
   wherein the system coordinator device is configured to direct the one or more node devices to self-form an upgrade network with the upgrade coordinator device.

3. The network system of claim 2, wherein the upgrade coordinator device is configured to upgrade the one or more of software or firmware of the one or more node devices and instruct the one or more node devices to subsequently communicatively decouple from the upgrade coordinator device and communicatively couple with the corresponding local coordinator device.

4. The network system of claim 2, wherein the upgrade coordinator device is configured to determine a bandwidth constraint of the upgrade network over which the one or more of software or firmware of the node devices is to be changed, and the upgrade coordinator device is configured to form the upgrade network with fewer than all the node devices needing based on the bandwidth constraint.

5. The network system of claim 1, wherein the node devices are configured to monitor one or more characteristics within the structure and to communicate signals representative of the one or more characteristics to the corresponding local coordinator devices with which the node devices are communicatively coupled.

6. The network system of claim 1, wherein the system coordinator device is configured to automatically direct the node devices to self-form the separate network groups based on rooms in a structure in which the node devices are located.

7. The network system of claim 1, wherein the network groups are separate in that none of the node devices is concurrently included in two different network groups of the separate network groups.

8. A method for self-forming a network system formed from two or more separate network groups, the method comprising:
   identifying node devices in a structure using a system coordinator device of a control commissioner device;
   communicatively coupling the node devices with the system coordinator device;
   determining which of the node devices are to be placed into separate network groups using the system coordinator device after the node devices are communicatively coupled with the system coordinator device;
   self-forming the separate network groups of different sets of the node devices by restricting which of the node devices can communicatively couple with different local coordinator devices, and
   determining to change one or more of software or firmware of one or more of the node devices using the system coordinator device and directing the one or more node devices to communicatively decouple from the corresponding local coordinator device and to communicatively couple with the upgrade coordinator;
   wherein the node devices of each of the separate network groups are configured to communicate with the local coordinator device associated with the network group after self-forming the separate network groups.

9. The method of claim 8, further comprising:
   self-forming an upgrade network including the system coordinator device and the one or more node devices; and
   changing the one or more of software or firmware of the one or more node devices using the upgrade coordinator device of the control commissioner device.

10. The method of claim 9, further comprising:
    determining a bandwidth constraint of the upgrade network over which to change the one or more of software or firmware of the node devices using the upgrade coordinator device, wherein the upgrade network is self-formed with fewer than all the node devices needing to change the one or more of software or firmware based on the bandwidth constraint.

11. The method of claim 8, wherein the separate network groups are formed by automatically directing the node devices to form the separate network groups based on rooms in the structure in which the node devices are located.

12. The method of claim 8, wherein the network groups are separate in that none of the node devices is concurrently included in two different network groups of the separate network groups.

13. A control commissioner device comprising:
a system coordinator device that is configured to communicatively couple with node devices distributed in a structure, the system coordinator device also configured to form separate network groups of different sets of the node devices by sending instruction signals to the node devices that direct the node devices in each of the separate network groups to communicatively couple with a different local coordinator device in the network system,
wherein the node devices of each of the separate network groups are configured to communicate with the local coordinator device associated with the network group after receiving the instruction signals from the control coordinator,
wherein the system coordinator device also is configured to determine whether to upgrade one or more of software or firmware of one or more of the node devices; and
an upgrade coordinator device configured to upgrade the one or more of software or firmware of the one or more node devices by directing the one or more node devices needing to upgrade to communicatively decouple from the corresponding local coordinator device and to communicatively couple with the upgrade coordinator.

14. The control commissioner device of claim 13, wherein the upgrade coordinator device is configured to upgrade the one or more of software or firmware of the one or more node devices and instruct the one or more node devices to subsequently communicatively decouple from the upgrade coordinator device and communicatively couple with the corresponding local coordinator device.

15. The control commissioner device of claim 13, wherein the upgrade coordinator device is configured to form the upgrade network with fewer than all the node devices needing to upgrade.

16. The control commissioner device of claim 13, wherein the upgrade coordinator device is configured to determine a bandwidth constraint of the upgrade network over which the one or more of software or firmware of the node devices is to occur, and the upgrade coordinator device is configured to form the upgrade network with fewer than all the node devices needing to upgrade based on the bandwidth constraint.

17. The control commissioner device of claim 13, wherein the node devices are configured to monitor one or more characteristics within the structure and to communicate signals representative of the one or more characteristics to the corresponding local coordinator devices with which the node devices are communicatively coupled.

18. The control commissioner device of claim 13, wherein the system coordinator device is configured to direct the node devices to form the separate network groups based on locations of the node devices within the structure.

19. The control commissioner device of claim 13, wherein the system coordinator device is configured to automatically direct the node devices to form the separate network groups based on rooms in the structure in which the node devices are located.

20. The control commissioner device of claim 13, wherein the system coordinator device is configured to direct the node devices to form the separate network groups based on signal strengths of signals communicated by the node devices.

* * * * *